United States Patent
Byrne et al.

(10) Patent No.: US 8,956,529 B2
(45) Date of Patent: Feb. 17, 2015

(54) POLYMERS AS ADDITIVES FOR THE SEPARATION OF OIL AND WATER PHASES IN EMULSIONS AND DISPERSIONS

(75) Inventors: Norman Edward Byrne, Sugar Land, TX (US); Joseph Manna, Quakertown, PA (US); Somil Chandrakant Mehta, Lansdale, PA (US); Peter Rozowski, Bellaire, TX (US)

(73) Assignee: Rohm and Haas Company, Midland, MI (US)

( * ) Notice: Subject to any disclaimer, the term of this patent is extended or adjusted under 35 U.S.C. 154(b) by 848 days.

(21) Appl. No.: 12/806,038

(22) Filed: Aug. 4, 2010

(65) Prior Publication Data

US 2011/0031163 A1  Feb. 10, 2011

Related U.S. Application Data

(60) Provisional application No. 61/273,491, filed on Aug. 5, 2009.

(51) Int. Cl.
*C10G 33/04* (2006.01)
*B01D 17/04* (2006.01)

(52) U.S. Cl.
CPC ............. *C10G 33/04* (2013.01); *C10G 2300/80* (2013.01); *B01D 17/047* (2013.01)
USPC ............ 208/188; 516/141; 516/143; 516/181

(58) Field of Classification Search
USPC ................. 208/187, 188; 516/141, 143, 181; 524/543, 550, 556
See application file for complete search history.

(56) References Cited

U.S. PATENT DOCUMENTS

| | | | | | |
|---|---|---|---|---|---|
| 4,778,591 | A | * | 10/1988 | Reynolds | 208/252 |
| 5,100,582 | A | * | 3/1992 | Bhattacharyya | 516/186 |
| 2007/0244248 | A1 | * | 10/2007 | Behles | 524/555 |
| 2007/0299143 | A1 | * | 12/2007 | Koczo et al. | 516/144 |

* cited by examiner

*Primary Examiner* — Renee E Robinson
(74) *Attorney, Agent, or Firm* — M. Robert Christy

(57) ABSTRACT

Oil-water dispersions and emulsions derived from petroleum industry operations are demulsified and clarified using anionic polymers. Formation of such oil-water dispersion and emulsions is inhibited and mitigated using the anionic polymers. The anionic polymers comprise: A) 2-80% by weight of at least one $C_3$-$C_8$ $\alpha,\beta$-ethylenically unsaturated carboxylic acid monomer; B) 15-80% by weight of at least one nonionic, copolymerizable $\alpha,\beta$-ethylenically unsaturated monomer; C) 1-50% by weight of one or more of the following monomers: C1) at least one nonionic vinyl surfactant ester; or C2) at least one nonionic, copolymerizable $\alpha,\beta$-ethylenically unsaturated monomer having longer polymer chains than monomer B), or C3) at least one nonionic urethane monomer; and, optionally, D) 0-5% by weight of at least one crosslinker.

7 Claims, No Drawings

POLYMERS AS ADDITIVES FOR THE SEPARATION OF OIL AND WATER PHASES IN EMULSIONS AND DISPERSIONS

This application claims the benefit of priority under 35 U.S.C. §119(e) of U.S. Provisional Patent Application No. 61/273,491 filed on Aug. 5, 2009.

FIELD OF THE INVENTION

The present invention relates to a method for demulsifying and clarifying oil-water emulsions and dispersions derived from petroleum production and refining operations using anionic polymers.

BACKGROUND OF THE INVENTION

A dispersion is a mixture in which one phase is dispersed in another, continuous phase, of a different composition or phase. An emulsion is a dispersion comprising two immiscible liquids, one of which is dispersed as droplets (internal phase) in the other (continuous or external phase). Thus, all emulsions are dispersions, but not all dispersions are emulsions. Stable emulsions are those which are unable to resolve themselves into their constituent phases without some form of mechanical or chemical treatment.

In the petroleum industry, various operations including, but not limited to, exploration, production, refining and chemical processing of hydrocarbons including, but not limited to, crude oil, gas and their derivative products, routinely produce mixtures and dispersions of oil and water. Such mixtures typically also contain other compounds, including but not limited to, waxes, asphaltenes, various salts, suspended materials, biological surface active material from the ground, added surface active corrosion/scale inhibiting reagents, etc., which may vary from location to location. In addition, synthetic and natural surfactants, produced either in-situ or added in enhanced oil recovery techniques such as akali-surfactant (AS) and alkali-surfactant-polymer (ASP) floods, can cause phase separation issues. Along with the presence of these other compounds, high shear and mixing forces cause these oil and water mixtures to form dispersions and relatively stable emulsions. Some such emulsions are water in oil emulsions, commonly referred to in the petroleum industry as "regular" emulsions, in which oil is the continuous phase. Others are oil in water emulsions, commonly referred to in the petroleum industry as "reverse" emulsions, in which water is the continuous phase.

"Breaking" oil-water emulsions means separation of the oil and water phases. The term "breaking" implies that the emulsifying films around the droplets of water or oil are "broken" so that coalescing may occur and result in separation of the oil and water phases over time, for example, by gravitational settling. For example, demulsifiers describe the class of agents which break or separate an emulsion, whether normal or reverse, into its constituent phases. Clarifiers describe compounds which are applied to break emulsions and separate the oil phase from the water, thereby, making the water "clearer." There is known to be some overlap in the types of compounds which effectively demulsify and those which clarify, i.e., some compounds are useful for both demulsifying and clarifying oil-water emulsions and dispersions.

During the production phase of an oil well, a large quantity of water may be pumped down into the ground via one or more injector wells to push oil in the underground formation toward the producing well and out of the ground. As the wells age, formation water is produced from the well in combination with the oil. Further, in many secondary and tertiary oil recovery techniques such as steam flooding, oil extraction from tar/oil sands and steam assisted gravity drainage (SAGD), large amounts of water are used to recover oil. In such circumstances, the oil typically comes out of the ground as an emulsion. To break this emulsion, i.e., separate the water from the oil phase, demulsifiers such as polyalkylene glycols (PAGs), block copolymers of polyethylene oxide) (PEO) and poly(propylene oxide) (PPO), and alkylphenol resin alkoxylates are generally used. In some cases water clarifiers are also added to the crude emulsion stream.

Once the emulsion is separated into an oil fraction and a water fraction, the produced water fraction (i.e., "produced water") may contain about 1000 parts per million (ppm) oil entrained in the water phase. In other words, a "reverse" i.e., oil in water, emulsion is formed. This emulsion appears anywhere from brown to black, depending on the amount of impurities present. Such produced water may be generated in huge quantities (i.e., up to millions of gallons per day), and is either reinjected into the formation, or disposed of into the ocean. Governmental regulations, such as the US Clean Water Act and the US EPA Code of Federal Regulations in the United States, require reduction of the amount of oil content down to very low levels before the produced water may be discharged. Although the amount of oil permitted in discharged water under such regulations varies from jurisdiction to jurisdiction, the standard is generally very low, i.e., usually much less than 100 ppm oil in water. Further with the increasing cost and regulation on fresh water use, low levels of oil are demanded for water reuse. The practice of reducing the oil in water from the naturally occurring amount to below 50 ppm is commonly known as "clarification," and is simply the breaking of the reverse emulsion. Clarification of such demulsified oilfield water typically involves use of acrylate polymers, cationic polymers, cationic polyelectrolytes, and water-soluble amphiphilic polymers to flocculate suspended oily and particulate materials and, thereby, obtain clear(er) water.

Successful selection and use of effective polymer compounds to demulsify and clarify oil-water emulsions formed during petroleum industry operations is very complex because whether or not a particular polymer will work depends on many factors including, but not limited to: the geology and location of underground oil-containing formations, the source of water, the nature of suspended solids, the type of oil, the nature of other reagents used, etc. Thus, there is no one solution for the practice of demulsification and clarification of oilfield emulsions. Depending on individual oilfields and the conditions involved, different polymers will provide optimum performance in different locations.

The prior art includes many patents and general literature relating to demulsification and clarification of oil-water dispersions and emulsions produced by petroleum industry operations. However, none disclose the use of anionic polymers based on acrylate monomers and their esters, which are hydrophobically modified or modified with surfactant-like groups or lightly crosslinked, for breaking oil-water emulsions derived from oilfield and oil refining operations.

For example, U.S. Patent Application Publication US 2007/0244248 discloses the use of a polymer containing aromatic and oleophilic groups for demulsifying oil-water emulsions. U.S. Pat. No. 5,100,582 discloses a very specific composition of tetrapolymer containing random combinations of acrylic acid, methacrylic acid, methyl methacrylate and butyl acrylate for use as demulsifying agent for water-in-crude oil.

Further, U.S. Pat. Nos. 6,025,426 and 5,330,650 each teach the use of hydrophilic cationic copolymers of acrylamide having high molecular weight as water clarification aids. U.S. Pat. No. 4,582,628 discloses the use of vinyl-type polymers, derived from hydrophilic and hydrophobic vinyl monomers, for demulsifying petroleum industry emulsions of oil and water.

Low molecular weight, water soluble, cationic polymers of dimethylaminoethyl acrylate methyl chloride and benzyl chloride quaternary salt are disclosed in U.S. Pat. No. 5,643,460 for breaking oil in water emulsions resulting from oilfield operations. U.S. Pat. No. 5,472,617 provides a method for demulsifying a crude oil and water emulsion which involves adding demulsifiers made from (meth)acrylates of oxyalkylates copolymerized with hydrophilic monomers.

Chinese Patent Application Publication CN1883740 discloses the use of polymers derived from hydrophobic (meth)acrylate ester monomers and hydrophilic (meth)acrylic acid monomers, and having molecular weights of 5,000 to 100,000 g/mol, for demulsifying crude oil and water emulsions.

None of the above-mentioned technologies utilizes hydrophobically modified, or surfactant modified, or lightly crosslinked anionic acrylate copolymers for separating oil and water dispersions or emulsions generated in connection with oilfield operations. It is believed that such anionic acrylate copolymers shall perform better than existing polymers used for demulsifying or clarifying such oil-water dispersions and emulsions.

SUMMARY OF THE INVENTION

The present invention provides a method for separating oil and water phases of an oil-water dispersion or emulsion derived from petroleum industry operations, comprising providing to the oil-water emulsion a demulsifying effective amount of an anionic polymer comprising: A) 15-80% by weight of at least one $C_3$-$C_8$ α,β-ethylenically unsaturated carboxylic acid monomer; B) 15-80% by weight of at least one nonionic, copolymerizable α,β-ethylenically unsaturated monomer; C) 1-50° A) by weight of one or more of the following: (1) at least one nonionic vinyl surfactant ester; (2) at least one nonionic, copolymerizable α,β-ethylenically unsaturated monomer having longer polymer chains than monomer B); and, (3) at least one nonionic urethane monomer; and D) optionally, 0-5% by weight of at least one crosslinker. All weight percents total 100 percent and are based on the total weight of the anionic polymer.

In particular, the at least one $C_3$-$C_8$ α,β-ethylenically unsaturated carboxylic acid monomer have the formula:

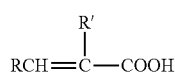
(I)

where R is H, and R' is H, $C_1$-$C_4$ alkyl, or —$CH_2COOX$; R is —COOX and R' is H or —$CH_2COOX$; or R is $CH_3$ and R' is H; and X is H or $C_1$-$C_4$ alkyl.

The at least one nonionic, copolymerizable α,β-ethylenically unsaturated monomer have the formula:

$$CH_2=CYZ \quad (II)$$

where Y is H and Z is —COOR, —$C_6H_4R'$, CN, Cl,

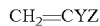

or —CH=$CH_2$; Y is $CH_3$ and Z is —COOR, —$C_6H_4R$, CN or —CH=$CH_2$; or Y and Z are Cl; and R is $C_1$-$C_8$ alkyl or $C_2$-$C_8$ hydroxyalkyl; R' is H, Cl, Br, or $C_1$-$C_3$ alkyl; and R" is $C_1$-$C_8$ alkyl.

Furthermore, monomeric component C) is one or more of the following monomers:
(1) at least one nonionic vinyl surfactant ester of the formula:

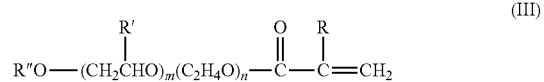
(III)

where R is H or $CH_3$, each R' is $C_1$-$C_4$ alkyl, R" is $C_8$-$C_{20}$ alkyl or $C_8$-$C_{16}$ alkylphenyl, n is an average number from 6-100, and m is an average number from about 0-50 provided that n≥m and (n+m) is about 6-100;
(2) at least one nonionic, copolymerizable α,β-ethylenically unsaturated monomer having longer polymer chains than monomer B) and having the formula;

$$CH_2=CYZ \quad (IV)$$

where Y is H and Z is —COOR, —$C_6H_4R$, or

Y is $CH_3$ and Z is —COOR, —$C_6H_4R'$ and R is $C_{10}$-$C_{20}$ alkyl hydroxyalkyl; R' is $C_4$-$C_8$ alkyl; and R" is $C_9$-$C_{20}$ alkyl; and
(3) at least one nonionic urethane monomer which is the urethane reaction product of a monohydric non-ionic surfactant with a monoethylenically unsaturated monoisocyanate.

In another embodiment, the present invention provides a method for inhibiting and mitigating the formation of oil-water emulsions generated during petroleum industry operations from oil and aqueous precursors which become mixed during the operations. This method for inhibiting and mitigating the formation of oil-water emulsions comprises providing a demulsifying effective amount of the aforesaid anionic polymer to the oil precursor, the aqueous precursor, or both, prior to, during or after mixing of the precursors.

The oil-water dispersion or emulsion may be an oil in water dispersion or emulsion, or a water in oil dispersion or emulsion. The carboxylic acid monomer A) may be methacrylic acid, acrylic acid or a mixture thereof. The unsaturated monomer B) may be a monovinyl ester.

DETAILED DESCRIPTION OF THE INVENTION

A "polymer," as used herein and as defined by F W Billmeyer, JR. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Chemicals that react with each other to form the repeat units of a polymer are known herein as "monomers," and a polymer is said herein to be made of, or comprise, "polymerized units" of the monomers that reacted to form the repeat units. The chemical reaction or reactions in which monomers react to become polymerized units of a polymer, whether a homopolymer or any type of copolymer, are known herein as "polymerizing" or "polymerization."

In all of the compositions herein the weight percentages will always total 100 percent. Thus, the percentages stated hereinbelow to describe the proportions of the various monomeric components in the polymer are all based on the total weight of the polymer, with the total being 100 percent Polymer molecular weights can be measured by standard methods such as, for example, size exclusion chromatography (also called gel permeation chromatography) or intrinsic viscosity.

As used herein, the prefix "(meth)acryl-" means "methacryl- or acryl-."

The term "petroleum industry operations," as used herein, includes, but not is limited to, activities and processes for exploration, production, refining and chemical processing of hydrocarbons including, but not limited to, crude oil, gas and their derivatives. For example, exploration often involves the initial drilling of wells wherein drilling fluid, or drilling mud, which is typically a mixture of liquid and gaseous fluids and solids, is used as lubricant and heat sink. Suitable dispersants are helpful to stabilize such mud to a homogenous composition. Production operations include, but are not limited to, pumping large quantities of water into the ground, as described above, which commensurately generates large quantities of "formation water," an oil in water dispersion or emulsion. Breaking of such emulsions with additives to remove and recover oil from the produced water is a common and beneficial practice. Oil refining processes, for example, include but are not limited to, the removal of inorganic solids and salts (referred to as "desalting") from produced oil. Desalting operations produce oil in water mixtures which require clarification and/or demulsifying prior to discharge or reuse. Lastly, chemical processing in the petroleum industry includes many various activities such as, for example, without limitation, production of ethylene by fractionation which involves water quench operations. The quench operations of ethylene manufacturing generate quench waters containing heavy, middle and light hydrocarbons and, therefore, require demulsifying and/or clarification. Persons of ordinary skill in the art will readily recognize the many various operations performed in the petroleum industry to which the present invention is reasonably applicable and the invention is intended to include all such applications.

The term "oil-water emulsion," as used herein, includes dispersions even where a stable emulsion does not exist and also includes water in oil emulsions and oil in water emulsions, as well as multiple emulsions, such as water in oil in water. Oil is the continuous, or external, phase in water in oil emulsions. For oil in water emulsions, the continuous, or external, phase is water.

Endpoints of ranges are considered to be definite and are recognized to incorporate within their tolerance other values within the knowledge of persons of ordinary skill in the art, including, but not limited to, those which are insignificantly different from the respective endpoint as related to this invention (in other words, endpoints are to be construed to incorporate values "about" or "close" or "near" to each respective endpoint). The range and ratio limits, recited herein, are combinable. For example, if ranges of 1-20 and 5-15 are recited for a particular parameter, it is understood that ranges of 1-5, 1-15, 5-20, or 15-20 are also contemplated and encompassed thereby.

The present invention provides a method for separating oil and water phases of an oil-water dispersion or emulsion derived from petroleum industry operations. The method comprises providing to the oil-water emulsion a demulsifying effective amount of an anionic polymer comprising:
A) at least one $C_3$-$C_8$ α,β-ethylenically unsaturated carboxylic acid monomer;
B) at least one nonionic, copolymerizable α,β-ethylenically unsaturated monomer;
C) one or more of the following:
  (1) at least one nonionic vinyl surfactant ester;
  (2) at least one nonionic, copolymerizable α,β-ethylenically unsaturated monomer having longer polymer chains than monomer B); and,
  (3) at least one nonionic urethane monomer; and
D) optionally, at least one crosslinker.

The anionic polymer may also comprise up to about 10% by weight, based on the total weight of the anionic polymer, of other anionic, cationic monomers, or nonionic monomers.

The present invention also provides a method for inhibiting and mitigating the formation of oil-water emulsions generated during petroleum industry operations from oil (organic) and water (aqueous) precursors which become mixed during said operations and otherwise form oil-water dispersions and emulsions. This method for inhibiting and mitigating the formation of oil-water emulsions comprises providing the above-described anionic polymer to the oil precursor, the aqueous precursor, or both, prior to, during or after mixing of the precursors.

Whether provided to the precursors of oil-water dispersion or emulsions, or to already formed oil-water dispersions or emulsions, the use of anionic polymers in accordance with the present invention may reduce the viscosity of the resulting mixture of oil and water and, thus, better flow characteristics may be achieved which may facilitate further processing and handling.

Furthermore, whereas cationic polymers have typically been used in petroleum industry operations as demulsifiers and/or clarifiers of oil-water dispersions and emulsions, use of the anionic polymers in accordance with the methods of the present invention is expected to reduce potential harm to the environment. This is because it is believed that the anionic polymers described herein and their use as oil-water demulsifiers and clarifiers are less toxic than the cationic polymers previously used.

More particularly, the anionic polymers suitable for use in accordance with the methods of the present invention comprise 15-80% by weight, based on the total weight of the anionic polymer, of at least one unsaturated carboxylic acid monomer A), having the formula:

(I)

where R is H, and R' is H, $C_1$-$C_4$ alkyl, or —$CH_2COOX$; R is —COOX and R' is H or —$CH_2COOX$; or R is $CH_3$ and R' is H; and X is H or $C_1$-$C_4$ alkyl.

Suitable $C_3$-$C_8$ α,β-ethylenically unsaturated carboxylic acid monomers A) for use in the methods of the present invention include, for example, without limitation, (meth)

acrylic acid, alpha-chloroacrylic acid, crotonic acid, fumaric acid, citraconic acid, mesaconic acid, itaconic acid, maleic acid, aconitic acid, and mixtures thereof. (Meth)acrylic acids are believed to be the most suitable.

The anionic polymers suitable for use in the methods of the present invention further comprise 15-80% by weight, based on the total weight of the anionic polymer, of at least one nonionic, copolymerizable $\alpha,\beta$-ethylenically unsaturated monomer B), having the formula:

$$CH_2\!=\!CYZ \qquad (II)$$

where Y is H and Z is —COOR, —$C_6H_4R$, CN, Cl,

or —CH=$CH_2$; Y is $CH_3$ and Z is —COOR, —$C_6H_4R'$, CN, C(O)OR, or —CH=$CH_2$; or Y and Z are Cl; and R is $C_1$-$C_8$ alkyl or $C_2$-$C_8$ hydroxyalkyl; R' is H, Cl, Br, or $C_1$-$C_3$ alkyl; and R" is $C_1$-$C_8$ alkyl.

Suitable nonionic, copolymerizable $C_2$-$C_{11}$ $\alpha,\beta$-ethylenically unsaturated monomers B) for use in the methods of the present invention include, for example, without limitation, $C_1$-$C_8$ alkyl and $C_2$-$C_8$ hydroxyalkyl esters of acrylic and methacrylic acid including ethyl acrylate, ethyl methacrylate, methyl methacrylate, 2-ethylhexyl acrylate, propyl methacrylate, isopropyl methacrylate, butyl acrylate, butyl methacrylate, n-amyl methacrylate, sec-amyl methacrylate, hexyl methacrylate, crotyl methacrylate, hydroxy ethyl methacrylate, hydroxy propyl methacrylate, 2-hydroxyethyl acrylate, 2-hydroxybutyl methacrylate; styrene, vinyltoluene, isopropylstyrene, and p-chlorostyrene; vinyl acetate, vinyl butyrate, vinyl caprolate; acrylonitrile, methacrylonitrile, butadiene, isoprene, vinyl chloride, vinylidene chloride, vinyl propionate, vinyl butyrate, vinyl tert-butyrate, vinyl caprate, vinyl methyl ether, vinyl ethyl ether, vinyl n-propyl ether, vinyl iso-propyl ether, vinyl n-butyl ether, vinyl iso-butyl ether, vinyl phenyl ether, $\alpha$-chlorovinyl phenyl ether, methacryonitrile, acrylamide, methacrylamide, N-alkyl acrylamides, N-aryl acrylamides, N-vinyl pyrrolidone, N-vinyl-3-morpholinones, N-vinyl-oxazolidone, N-vinyl-imidazole, and combinations thereof. In practice, a monovinyl ester such as ethyl acrylate, butyl acrylate, or a mixture thereof with styrene, hydroxyethyl acrylate, acrylonitrile, vinyl chloride or vinyl acetate is preferred.

The anionic polymers suitable for use in the methods of the present invention may further comprise 1-50% by weight, based on the total weight of the anionic polymer, of one or more of the following monomers:

C1) at least one nonionic vinyl surfactant ester monomer, having the formula:

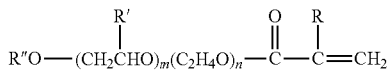

(III)

where R is H or $CH_3$, each R' is $C_1$-$C_4$ alkyl, R" is $C_8$-$C_{30}$ alkyl or $C_8$-$C_{16}$ alkylphenyl, n is an average number from 6-100, and m is an average number from about 0-50 provided that n≥m and (n+m) is about 6-100;

C2) at least one nonionic, copolymerizable $\alpha,\beta$-ethylenically unsaturated monomer, having longer polymer chains than monomer B) and having the formula:

$$CH_2\!=\!CYZ \qquad (IV)$$

where Y is H and Z is —COOR, —$C_6H_4R'$,

Y is $CH_3$ and Z is —COOR, —$C_6H_4R'$, C(O)OR; and R is $C_{10}$-$C_{20}$ alkyl hydroxyalkyl; R' is $C_4$-$C_8$ alkyl; and R" is $C_9$-$C_{20}$ alkyl; or C3) at least one nonionic urethane monomer which is the urethane reaction product of a monohydric non-ionic surfactant with a monoethylenically unsaturated monoisocyanate.

Suitable nonionic vinyl surfactant ester monomers C1) for use in the methods of the present invention are selected from the group consisting of:

(1) alkylphenoxypoly(ethyleneoxy)ethyl acrylates of the formula:

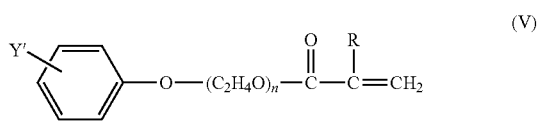

where R is H or $CH_3$; Y' is $C_8$-$C_{16}$ alkyl, and n is about 6-100;

(2) alkoxypoly(ethyleneoxy)ethyl acrylates of the formula:

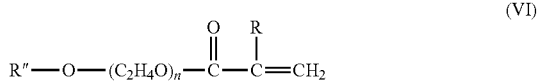

where R is H or $CH_3$, R" is $C_8$-$C_{20}$ alkyl, and n is about 6-50; and (3) alkoxypoly(alkyleneoxy)ethyl acrylates of the formula:

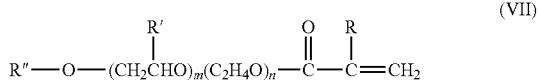

where R is H or $CH_3$, each R' is $C_1$-$C_4$ alkyl, R" is $C_8$-$C_{20}$ alkyl, and n is about 6-50 and m is about 1-40.

Suitable nonionic, copolymerizable $\alpha,\beta$-ethylenically unsaturated monomers C2) include, but are not limited to: lauryl methacrylate, stearyl methacrylate, ethylhexyl methacrylate, cinnamyl methacrylate, oleyl methacrylate, ricinoleyl methacrylate, t-butylstyrene, vinyl decanoate, vinyl stearate, vinyl laurate, vinyl oleate, vinyl iso-octyl ether, vinyl $\beta$-naphthyl ether, and combinations thereof.

Suitable nonionic urethane monomers include, but are not limited to, alkyl modified alpha-dimethyl-m-isopropenyl benzyl isocyanate, where the alkyl groups are, for example, nonyl-phenol, octyl-phenol, dinonyl-phenol, lauryl, stearyl, oleyl, and the like. Dimethyl-m-isopropenyl benzyl isocyanate is believed to be particularly suitable in the method of the present invention.

The anionic polymers suitable for use in the methods of the present invention further comprise, optionally, 0-5% by weight, based on the total weight of the anionic polymer, of at least one crosslinker D). For example, the anionic polymers may further include 0-3% by weight, or even 0-2% by weight, of at least one crosslinker.

Crosslinkers D) suitable for use in the methods of the present invention include, for example, without limitation, any copolymerizable compound which contains two or more nonconjugated points of ethylenic unsaturation or two or more nonconjugated vinylidene groups of the structure, $CH_2=C=$, such as divinyltoluene, trivinylbenzene, divinylnaphthalene, trimethylene glycol diacrylate or dimethacrylate, 2-ethylhexane-1,3-dimethyacrylate, divinylxylene, divinylethylbenzene, divinyl ether, divinyl sulfone, allyl ethers of polyhdric compounds such as of glycerol, pentaerythritol, sorbitol, sucrose and resorcinol, divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, trimethylolpropane diallyl ether, triallyl tricarballylate, triallyl aconitate, triallyl citrate, triallyl phosphate, N,N-methylenediacrylamide, N,N'-methylenedimethacrylamide, N,N'-ethylidenediacrylamide, 1,2-di-(α-methylmethylenesulfonamide)-ethylene, and combinations thereof. Trimethylolpropane diallyl ether is believed to be particularly suitable.

The weight percentages of the monomers comprising the anionic polymer total 100 percent.

The anionic polymers suitable for use in the methods of the present invention have weight average molecular weights between 10,000 and 20,000,000 g/mol, such as between 10,000 and 10,000,000 g/mol, or even between 40,000 and 1,000,000 g/mol. The anionic polymer molecular weights may be determined by standard methods such as, for example, size exclusion chromatography (also called gel permeation chromatography) or intrinsic viscosity. As will be understood by persons of ordinary skill in the relevant art, since some of the anionic polymers suitable for use in the present invention may be crosslinked and, therefore, may comprise extremely large polymer molecules. The molecular weight of such crosslinked anionic polymers may be extremely high and, therefore, practicably unmeasurable.

A demulsifying effective amount of anionic polymer, where it is to be added to a water in oil emulsion, or to the oil precursor of a water in oil dispersion or emulsion, is suitably 1 to 10,000 ppm, for example 1 to 1,000 ppm, or 1 to 500 ppm, or even 1 to 100 ppm. When added to an oil in water emulsion, for example, without limitation, comprising up to 10% by volume water, or to the aqueous precursor of an oil in water dispersion or emulsion, a demulsifying effective amount of anionic polymer is suitably 1 to 10,000 ppm, for example 1 to 1,000 ppm, or 1 to 500 ppm, or 1 to 200 ppm, or 1 to 100 ppm, or even 1 to 50 ppm.

Anionic polymers in accordance with the present invention may be produced using any polymerization method, including, for example, solution polymerization, bulk polymerization, heterogeneous phase polymerization (including, for example, emulsion polymerization, suspension polymerization, dispersion polymerization, and reverse-emulsion polymerization), and combinations thereof. Independently, any type of polymerization reaction, including, for example, free radical polymerization, may be used. The preferred method of polymerization for production of anionic polymers suitable for use in the method of the present invention is emulsion polymerization. Such methods are well known in the prior art and the details can be found in U.S. Pat. No. 4,384,096.

When solution polymerization is used, the solvent may be an aqueous solvent (i.e., the solvent is 75% or more water, by weight, based on the weight of the solvent) or an organic solvent (i.e., a solvent that is not aqueous). Some suitable solvents contain, for example, a mixture of water and up to 75% by weight, based on the mixture, of one or more OH-containing solvents, which may be selected from the group consisting of: $C_1$-$C_4$-alkanols; $C_2$-$C_{10}$-alkylene glycols, in which the alkylene chain may be interrupted by one or more non-adjacent oxygen atoms; monoethers of the $C_2$-$C_{10}$-alkylene glycols with $C_1$-$C_4$-alkanols; and mixtures thereof.

Examples of suitable OH-containing solvents are methanol, ethanol, isopropanol, n-butanol, ethylene glycol, diethylene glycol, methyl diglycol, dipropylene glycol, butyl glycol, butyl diglycol, triethylene glycol, the methylethers of said glycols and also oligomers of ethylene oxide containing from 4 to 6 ethylene oxide units, oligomers of propylene oxide containing from 3 to 6 propylene oxide units and also polyethylene glycol-polypropylene glycol cooligomers. Independently, a solvent that contains water may optionally further contain one or more other water-miscible solvents such as, for example, acetone, methyl ethyl ketone, tetrahydrofuran, dioxane, N-methylpyrrolidone, dimethylformamide, etc.

In some embodiments, at least one copolymer is made by free radical polymerization in solution or emulsion. In some of such embodiments, for example, at least one copolymer is made by free radical solution polymerization in an aqueous solvent.

Typically, polymerization takes place in a reaction vessel. It is contemplated that some or all monomer is added to the reaction vessel while polymerization is occurring. For example, initiator may be added to the reaction vessel prior to monomer, and the conditions of reaction vessel (e.g., temperature, radiation, presence of reactive species, etc.) may be adjusted so that the initiator generates one or more free radicals prior to addition of monomer. For another example, initiator may be added simultaneously with all of or with a portion of one or more monomers. It is also contemplated that initiator may be added both before monomer and also simultaneously with one or more monomer.

In some embodiments, the process for preparing the polymer in accordance with the present invention involves forming a copolymer using one or more free-radical polymerization reactions. Among such embodiments, some involve the use of one or more initiators. An initiator is a molecule or mixture of molecules that, under certain conditions, produces at least one free radical capable of initiating a free-radical polymerization reaction. Some initiators ("thermal initiators") produce such radicals by decomposing when exposed to sufficiently high temperature. Some initiators produce such radicals when certain molecules are mixed together to cause a chemical reaction that results in at least one free radical (such as, for example, some combinations known as "redox" initiators, which contain at least one oxidizing agent and at least one reducing agent). Some initiators ("photoinitiators") produce radicals when exposed to radiation, such as, for example, ultraviolet light or electron beam. Also contemplated are initiators that can be exposed to high temperature simultaneously with the presence of at least one reducing agent, and such initiators may produce free radicals by thermal decomposition, by oxidation-reduction reaction, or by a combination thereof.

Examples of suitable photoinitiators are azobisisobutyronitrile, benzophenone, acetophenone, benzoin ether, benzyl dialkyl ketones and derivatives thereof.

Of the suitable thermal initiators, some have a decomposition temperature of 20° C. or higher; or 50° C. or higher. Independently, some have decomposition temperature of 180° C. or lower; or 90° C. or lower. Examples of suitable thermal initiators are inorganic peroxo-compounds, such as peroxodisulfates (ammonium and sodium peroxodisulfate), peroxosulfates, percarbonates and hydrogen peroxide;

organic peroxo compounds, such as diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl peracetate, tert-butyl permaleate, tert-butyl perisobutyrate, tert-butyl perpivalate, tert-butyl peroctoate, tert-butyl pemeodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds, such as 2,2'-azobisisobutyronitrile, 2,2'-azobis (2-methylbutyronitrile), 2,2'-Azobis (2-methylpropionamidine)-dihydrochloride, and azobis(2-amidopropane) dihydrochloride.

In some embodiments, thermal initiators can optionally be used in combination with reducing compounds. Examples of such reducing compounds are phosphorus-containing compounds, such as phosphorus acid, hypophosphites and phosphinates; sulfur-containing compounds, such as sodium hydrogen sulfite, sodium sulfite, sodium metabisulfite, and sodium formaldehyde sulfoxylate; and hydrazine. It is considered that these reducing compounds, in some cases, also function as chain regulators.

One group of suitable initiators is the group of persulfates, including, for example, sodium persulfate. In some embodiments one or more persulfate is used in the presence of one or more reducing agents, including, for example, metal ions (such as, for example, ferrous ion, copper), sulfur-containing ions (such as, for example, $S_2O_3(=)$, $HSO_3(—)$, $SO_3(=)$, $S_2O_5(=)$, and mixtures thereof), and mixtures thereof.

When initiator is used, the amount of all initiator used, as a weight percentage based on the total weight of all monomers present, is 0.01° A) or more; or 0.03° A) or more; or 0.1% or more; or 0.3% or more. Independently, when initiator is used, the ratio of the weight of all initiator used to the total weight of all monomers used is 7% or less; or 3% or less; or 1% or less.

When initiator is used, it may be added in any fashion, at any time during the process. For example, some or all of the initiator may be added to the reaction vessel at the same time that one or more of the monomers are being added to the reaction vessel. In some embodiments, the initiator is added with a constant rate of addition. In other embodiments, the initiator is added with an increasing rate of addition, for example in two or more steps, where each step uses a higher rate of addition than the previous step. In some embodiments, the rate of addition of initiator increases and then decreases.

The process for preparing polymers in accordance with the present invention also involves the use of a chain regulator. A chain regulator is a compound that acts to limit the length of a growing polymer chain. Some suitable chain regulators are, for example, sulfur compounds, such as mercaptoethanol, 2-ethylhexyl thioglycolate, thioglycolic acid, and dodecyl mercaptan. Other suitable chain regulators are the reducing compounds mentioned herein above. In some embodiments, the chain regulator includes sodium metabisulfite. In some embodiments, the amount of chain regulator, as a percentage by weight based on the total weight of all monomers present, is 0% or 0.5° A) or more; or 1% or more; or 2% or more; or 4% or more. Independently, in some embodiments, the amount of chain regulator, as a percentage by weight based on the total weight of all monomers present, is 6% or less; or 4% or less; or 2% or less. In some embodiments, amounts of initiator larger than the amount needed to initiate polymerization can act as a chain regulator.

Other suitable chain regulators are, for example, the OH-containing compounds described hereinabove as suitable for use in a mixture with water to form a solvent. It is contemplated that, in some embodiments, the chain regulator is a component of the solvent and thus the chain regulator may be present in amounts larger than 15% by weight total weight of all monomers present.

Chain regulator may be added to the reaction vessel in any fashion. In some embodiments, the chain regulator is added to the reaction vessel at a constant rate of addition. In some embodiments, the chain regulator is added to the reaction vessel at a rate of addition that increases or decreases or a combination thereof.

For each ingredient that is added to the reaction vessel, that ingredient may be added in pure form. Alternatively, an ingredient that is added to the reaction vessel may be added in the form of a solution in a solvent, in the form of a mixture with one or more other ingredient, or as a combination thereof (i.e., as a mixture with, one or more other ingredient, where that mixture is dissolved in a solvent). The form in which any one ingredient is added to the reaction vessel may be chosen independently of the form in which any other ingredient is added to the reaction vessel.

The anionic polymer may be provided to the oil-water emulsion as a dry powder, an emulsion, or even as an aqueous solution, depending upon the nature of the oil-water emulsion to be treated. The anionic polymer is typically in emulsion form at lower pH (such as lower than about 3.5 pH), but upon neutralization (i.e., greater than about 7 pH), the anionic polymer becomes water soluble. Thus, the anionic polymer may be effectively provided to the oil-water emulsion in various ways such as, but not limited to, direct feed, very dilute form, neutralized or unneutralized, etc. The anionic polymer may be neutralized by any means known to persons of ordinary skill, such as with an alkali metal or alkaline earth metal, linear or branched $C_1$-$C_4$ alkyl groups, aryl groups, nitrogen-containing groups such as amine or ammonium prior to providing it to the oil-water emulsion The anionic polymer may be provided to the oil-water emulsion by any suitable method or process such as, without limitation, via gas lift mandrels, capillary tubes, umbilicals, etc. The way in which the anionic polymer is provided is not critical and many delivery methods are well known and understood by persons of ordinary skill in the relevant art.

The use of reverse emulsion breaker compounds, which are typically lower molecular weight, high charge materials that break reverse emulsions so that the flocculants can function better, is common in petroleum industry operations. Examples of such reverse emulsion breaker compounds are, without limitation, polyamines, polyamine quats (??), tannins, and metal salts (Al-, Fe-based chlorides, hydroxides, etc.). The method of the present invention may further comprise use of the above-described anionic polymers along with such reverse emulsion breaker compounds.

Blends and formulations of the anionic polymer with other components such as, without limitation, antifreeze agents, solvents, biocides, neutralizing agents, flow aids, and the like, may be formed and used in accordance with the method of the present invention. Such blends and formulations may be prepared as an emulsion or aqueous solution or otherwise. They may also be prepared and provided to the oil-water dispersion or emulsion as organic blends with ethylene glycol, methanol, etc.

It will be understood that the embodiments of the present invention described hereinabove are merely exemplary and that a person skilled in the art may make variations and modifications without departing from the spirit and scope of the invention. All such variations and modifications are intended to be included within the scope of the present invention.

What is claimed is:

1. A method for separating oil and water phases of an oil-water dispersion or emulsion derived from petroleum industry operations, comprising providing to the oil-water emulsion 1 to 10,000 ppm of an anionic polymer consisting of:
A) 15-80% by weight of at least one $C_3$-$C_8$ α,β-ethylenically unsaturated carboxylic acid monomer of the formula:

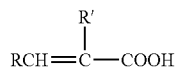  (I)

where R is H, and R' is H, $C_1$-$C_4$ alkyl, or —$CH_2COOX$;
R is —COOX and R' is H or —$CH_2COOX$; or
R is $CH_3$ and R' is H; and
X is H or $C_1$-$C_4$ alkyl;
B) 15-80% by weight of at least one nonionic, copolymerizable α,β-ethylenically unsaturated monomer of the formula:

$CH_2$=CYZ  (II)

where
Y is H and Z is —COOR, CN, Cl,

or —CH=$CH_2$;
Y is $CH_3$ and Z is —COOR, CN or —CH=$CH_2$; or
Y and Z are Cl; and
R is $C_1$-$C_8$ alkyl or $C_2$-$C_8$ hydroxyalkyl; and
R" is $C_1$-$C_8$ alkyl;
C) 1-50% by weight of one or more of the following monomers:
(1) at least one nonionic vinyl surfactant ester of the formula:

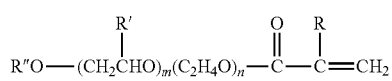  (III)

where
R is H or $CH_3$, each R' is $C_1$-$C_4$ alkyl,
R" is $C_8$-$C_{20}$ alkyl,
n is an average number from 6-100, and m is an average number from about 0-50 provided that n≥m and (n+m) is about 6-100; and
(2) at least one nonionic, copolymerizable α,β-ethylenically unsaturated monomer having longer polymer chains than monomer B) and is selected from lauryl methacrylate, stearyl methacrylate, ethylhexyl methacrylate, oleyl methacrylate, ricinoleyl methacrylate, vinyl decanoate, vinyl stearate, vinyl laurate, vinyl oleate, vinyl iso-octyl ether, and combinations thereof and
(3) at least one nonionic urethane monomer which is the urethane reaction product of a monohydric non-ionic surfactant with a monoethylenically unsaturated monoisocyanate; and D) 0-5% by weight of at least one crosslinker,
wherein all weight percents total 100 percent and are based on the total weight of the anionic polymer.

2. The method according to claim 1, wherein the oil-water dispersion or emulsion is an oil in water dispersion or emulsion.

3. The method according to claim 1, wherein the oil-water dispersion or emulsion is a water in oil dispersion or emulsion.

4. The method according to claim 1, wherein the carboxylic acid monomer A) is methacrylic acid, acrylic acid or a mixture thereof.

5. The method according to claim 1, wherein the unsaturated monomer B) is a monovinyl ester.

6. A method for inhibiting and mitigating the formation of oil-water emulsions generated during petroleum industry operations from oil and aqueous precursors which become mixed during said operations, said method comprising providing to the oil precursor, the aqueous precursor, or both, prior to, during or after mixing of the precursors, 1 to 10,000 ppm of an anionic polymer consisting of:
A) 15-80% by weight of at least one $C_3$-$C_8$ α,β-ethylenically unsaturated carboxylic acid monomer of the formula:

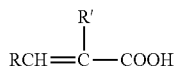  (I)

where R is H, and R' is H, $C_1$-$C_4$ alkyl, or —$CH_2COOX$;
R is —COOX and R' is H or —$CH_2COOX$; or
R is $CH_3$ and R' is H; and
X is H or $C_1$-$C_4$ alkyl;
B) 15-80% by weight of at least one nonionic, copolymerizable α,β-ethylenically unsaturated monomer of the formula:

$CH_2$=CYZ  (II)

where
Y is H and Z is —COOR, CN, Cl,

or —CH=$CH_2$;
Y is $CH_3$ and Z is —COOR, CN or —CH=$CH_2$; or
Y and Z are Cl; and
R is $C_1$-$C_8$ alkyl or $C_2$-$C_8$ hydroxyalkyl; and
R" is $C_1$-$C_8$ alkyl;
C) 1-50% by weight of one or more of the following monomers:
(1) at least one nonionic vinyl surfactant ester of the formula:

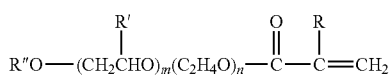  (III)

where
R is H or $CH_3$, each R' is $C_1$-$C_4$ alkyl,
R" is $C_8$-$C_{20}$ alkyl, n is an average number from 6-100, and m is an average number from about 0-50 provided that n≥m and (n+m) is about 6-100; and (2) at least one nonionic, copolymerizable α,β-ethylenically unsaturated monomer having longer polymer chains than monomer B) and is selected from lauryl methacrylate, stearyl methacrylate, ethylhexyl methacrylate, oleyl methacrylate, ricinoleyl methacrylate, vinyl decanoate, vinyl stearate, vinyl laurate, vinyl oleate, vinyl iso-octyl ether, and combinations thereof;

$$CH_2=CYZ \tag{IV}$$

where Y is H and Z is —COOR, or

Y is $CH_3$ and Z is —COOR, and R is $C_{10}$-$C_{20}$ alkyl hydroxyalkyl; R' is $C_4$-$C_8$ alkyl; and R" is $C_9$-$C_{20}$ alkyl; and (3) at least one nonionic urethane monomer which is the urethane reaction product of a monohydric non-ionic surfactant with a monoethylenically unsaturated monoisocyanate; and D) 0-5% by weight of at least one crosslinker, wherein all weight percents total 100 percent and are based on the total weight of the anionic polymer.

7. The method according to claim 6, wherein the anionic polymer is provided to the aqueous precursor.

\* \* \* \* \*